(12) United States Patent
Sequeira et al.

(10) Patent No.: US 12,417,684 B2
(45) Date of Patent: Sep. 16, 2025

(54) SYSTEMS AND METHODS FOR AVERTING CRIME WITH LOOK-AHEAD ANALYTICS

(71) Applicant: Sensormatic Electronics, LLC, Boca Raton, FL (US)

(72) Inventors: Melwyn F. Sequeira, Plantation, FL (US); Hubert A. Patterson, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/991,472

(22) Filed: Nov. 21, 2022

(65) Prior Publication Data

US 2023/0085515 A1 Mar. 16, 2023

Related U.S. Application Data

(63) Continuation of application No. 16/574,953, filed on Sep. 18, 2019, now Pat. No. 11,514,767.

(51) Int. Cl.
*G08B 13/22* (2006.01)
*G06N 20/00* (2019.01)
*G08B 13/181* (2006.01)
*H04W 72/0453* (2023.01)

(52) U.S. Cl.
CPC ............ *G08B 13/22* (2013.01); *G06N 20/00* (2019.01); *G08B 13/181* (2013.01); *H04W 72/0453* (2013.01)

(58) Field of Classification Search
CPC ...... G08B 13/22; G08B 13/181; G06N 20/00; H04W 72/0453
See application file for complete search history.

(56) References Cited

U.S. PATENT DOCUMENTS

| | | | |
|---|---|---|---|
| 4,656,463 | A | 4/1987 | Anders et al. |
| 4,827,395 | A | 5/1989 | Anders et al. |
| 6,011,468 | A | 1/2000 | Lee |
| 9,778,749 | B2 | 10/2017 | Poupyrev |
| 10,109,168 | B1 | 10/2018 | Devison et al. |
| 10,497,232 | B1 | 12/2019 | Koskan et al. |
| 10,812,992 | B1 | 10/2020 | Tran et al. |

(Continued)

OTHER PUBLICATIONS

International Search Report and Written Opinion in PCT/US2020/051089, mailed Dec. 3, 2020, 16 pages.

(Continued)

*Primary Examiner* — Rufus C Point
(74) *Attorney, Agent, or Firm* — ArentFox Schiff LLP

(57) ABSTRACT

Systems and methods for operating a security system. The methods comprise: monitoring an area for a presence of an individual or vehicle using wireless signals of a first type that are received by a first radio of the security system; operating the first radio as a wireless sensor for generating sensor data; determining whether the individual or vehicle is exhibiting an unusual behavior using the sensor data and pre-programmed or machine learned patterns of unusual behavior; changing an operating frequency of the first radio when a determination is made that the individual or vehicle is exhibiting unusual behavior; and communicating a wireless signal of a second type from the first radio when the individual or vehicle is exhibiting unusual behavior, where the second type is different than the first type.

20 Claims, 6 Drawing Sheets

(56) References Cited

U.S. PATENT DOCUMENTS

| | | |
|---|---|---|
| 2003/0160701 A1 | 8/2003 | Nakamura et al. |
| 2004/0066302 A1 | 4/2004 | Menard et al. |
| 2005/0251383 A1* | 11/2005 | Murray .................. G06F 40/30 704/9 |
| 2006/0028556 A1* | 2/2006 | Bunn ...................... H04N 7/181 348/E7.086 |
| 2006/0190419 A1 | 8/2006 | Bunn et al. |
| 2006/0214837 A1 | 9/2006 | Liu et al. |
| 2007/0069901 A1 | 3/2007 | Tuck et al. |
| 2007/0247315 A1 | 10/2007 | Nagai et al. |
| 2008/0079561 A1 | 4/2008 | Trundle et al. |
| 2010/0027378 A1* | 2/2010 | Sabatier ............. G08B 13/1645 367/136 |
| 2010/0029219 A1 | 2/2010 | Pacull |
| 2013/0242093 A1 | 9/2013 | Cobb et al. |
| 2014/0323106 A1 | 10/2014 | Nunally |
| 2014/0354527 A1 | 12/2014 | Chen et al. |
| 2015/0071492 A1 | 3/2015 | Barr et al. |
| 2015/0113632 A1 | 4/2015 | Saito et al. |
| 2015/0319540 A1* | 11/2015 | Rubinstein ............... H04R 3/00 381/172 |
| 2015/0341599 A1 | 11/2015 | Carey |
| 2016/0227535 A1 | 8/2016 | Sharma et al. |
| 2016/0266577 A1 | 9/2016 | Kerzner |
| 2017/0041912 A1 | 2/2017 | Tanaka |
| 2017/0094640 A1 | 3/2017 | Jeong et al. |
| 2017/0359804 A1 | 12/2017 | Manku et al. |
| 2018/0005501 A1 | 1/2018 | Ishino et al. |
| 2018/0027472 A1 | 1/2018 | Qiao et al. |
| 2018/0157902 A1 | 6/2018 | Tu et al. |
| 2018/0287821 A1 | 10/2018 | Klepser |
| 2018/0357870 A1 | 12/2018 | Siminoff et al. |
| 2019/0057777 A1 | 2/2019 | Joshi et al. |
| 2019/0080277 A1 | 3/2019 | Trivelpiece et al. |
| 2019/0096220 A1 | 3/2019 | Anderholm et al. |
| 2019/0097865 A1 | 3/2019 | Xu et al. |
| 2019/0199756 A1 | 6/2019 | Correnti et al. |
| 2019/0222995 A1 | 7/2019 | Abouelseoud et al. |
| 2019/0341067 A1* | 11/2019 | Rajendran ............... G10L 25/30 |
| 2020/0019891 A1 | 1/2020 | Poirel et al. |
| 2020/0151440 A1 | 5/2020 | Wang et al. |
| 2020/0162489 A1 | 5/2020 | Bar-Nahum et al. |

OTHER PUBLICATIONS

Singh et al., "Sense through wall human detection using UWB radar," EURASIP Journal on Wireless Communications and Networking, Jun. 2011, Article No. 20, pp. 1-11.

Vanderhulst et al., "Detecting Human Encounters from WiFi Radio Signals," MUM '15 Proceedings of the 14th International Conference on Mobile and Ubiquitous Multimedia, Nov. 30-Dec. 2, 2015, pp. 1-12.

Xu et al., "Indoor Localization Design and Implementation Based on Software Defined Radio," IEEE 18th International Conference on Communication Technology (ICCT), Chongqing, China, Oct. 2018, pp. 701-705.

* cited by examiner

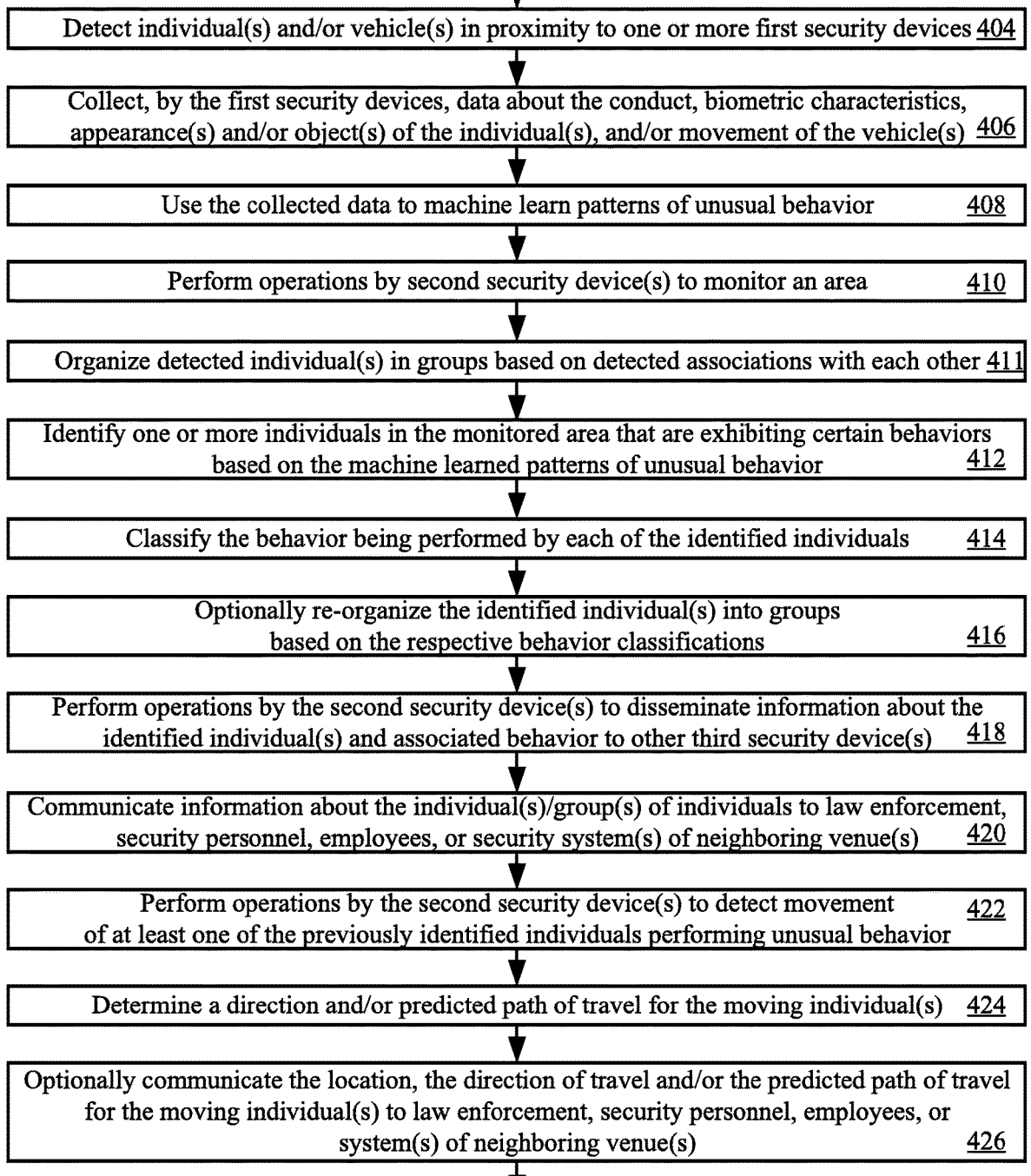

SYSTEMS AND METHODS FOR AVERTING CRIME WITH LOOK-AHEAD ANALYTICS

CLAIM OF PRIORITY UNDER 35 U.S.C. § 119

The present Application for Patent is a continuation of patent application Ser. No. 16/574,953, entitled "SYSTEMS AND METHODS FOR AVERTING CRIME WITH LOOK-AHEAD ANALYTICS" filed Sep. 18, 2019, which is assigned to the assignee hereof and hereby expressly incorporated by reference herein for all purposes.

BACKGROUND

Statement of the Technical Field

The present disclosure relates generally to security systems. More particularly, the present disclosure relates to implementing systems and methods for averting crime with look-ahead analytics.

Description of the Related Art

Business entities have traditionally used cameras perched on building tops to monitor parking lots and other areas surrounding their facilities. Video data gathered from these cameras is recorded for identification of theft and/or incident reporting. The cameras often include visible cameras, Infrared ("IW") cameras, and/or Ultraviolet ("UV") cameras.

The camera based solution has inherent drawbacks. In this regard, it should be appreciated that the cameras are subjected to dust, grime, and changing weather conditions. This makes it difficult to visualize and/or properly assess behaviors of individuals in the monitored areas of the facilities. Hence, significant signal processing power is required to sift through the environmental noise and pull out intelligible and accurate data in an effort to minimize false detection of suspicious activities. Secondly, concealed weapons and/or sharp objects cannot be "seen" using conventional camera based vision systems. Additionally, IR cameras are prone to "wash out" from bright sun and normal daytime contrast.

Moreover, incident detections are made (based on the camera data) after-the-fact. Local law enforcement officials are then provided incident reports. The incident reports may or may not be made readily available to the business entities. In most cases, the business entities are notified of the incidents long after the same has occurred. This after-the-fact notification does not aid the business entities in preparing ahead of time, for an impending theft or attack.

SUMMARY

The present document concerns implementing systems and methods for operating a security system. The methods comprise: monitoring an area for a presence of an individual or vehicle using wireless signals of a first type (e.g., Long Range Radio ("LRR") signals or a Short Range Radio ("SRR") signals) that are received by a first radio of the security system; operating the first radio as a wireless sensor for generating sensor data; determining whether the individual or vehicle is exhibiting an unusual behavior using the sensor data and pre-programmed or machine learned patterns of unusual behavior; changing an operating frequency of the first radio when a determination is made that the individual or vehicle is exhibiting unusual behavior; and/or communicating a wireless signal of a second type (e.g., an SRR signal, a sub-GHz signal or a cellular signal) from the first radio when the individual or vehicle is exhibiting unusual behavior. The wireless signal of the second type is different than the wireless signal of the first type. The wireless signal of the second type may: disseminate information about the individual or vehicle to second radios of the security system; communicate information to law enforcement, security personnel, an employee, or a system of a neighboring venue; and/or cause a dynamic activation of a second radio of the security system which has a Field Of View ("FOV") into which the individual or vehicle is predicted to soon enter.

In some scenarios, the operating frequency of the first radio is changed when the individual or vehicle is present within the area. The wireless signals of a third type are received by the first radio when operating as the wireless sensor. The wireless signals of the third type are different than the wireless signals of the first and second types. The wireless signals of the third type can include, but are not limited to, Long Range Radio ("LRR") signals, Short Range Radio ("SRR") signals, or Ultra Wide-Band ("UWB") signals.

In those or other some scenarios, the sensor data is also used to assign the individual to a first group of individuals based on at least one of a detected association with another individual. The first group may include, but is not limited to, a group of individuals with an intent to steal or cause physical harm to other or personal property. The unusual behavior being exhibited by the individual is classified. The unusual behavior may be classified as theft, collusion, attack, reconnaissance, surveying, break in, arson or loitering. The individual may be re-assigned to a second group of individuals based on the classification of the unusual behavior.

The present document also concerns a security system. The security system comprises a first radio. The first radio comprises a non-transitory computer-readable medium comprising programming instructions that, when executed, cause the radio to: monitor an area for a presence of an individual or vehicle using wireless signals of a first type that are received by the first radio; operate as a wireless sensor for generating sensor data; determine whether the individual or vehicle is exhibiting an unusual behavior using the sensor data and pre-programmed or machine learned patterns (e.g., of unusual behavior); change an operating frequency when a determination is made that the individual or vehicle is exhibiting unusual behavior; and communicate a wireless signal of a second type when the individual or vehicle is exhibiting unusual behavior. The wireless signal of the second type is different than the wireless signal of the first type.

In some scenarios, the programming instructions also cause the first radio to: change the operating frequency radio when the individual or vehicle is present within the area; use the sensor data to assign the individual to a first group of individuals based on at least one of a detected association with another individual; classify the unusual behavior being exhibited by the individual; and/or re-assign the individual to a second group of individuals based on the classification of the unusual behavior.

BRIEF DESCRIPTION OF THE DRAWINGS

Embodiments will be described with reference to the following drawing figures, in which like numerals represent like items throughout the figures.

FIGS. 4A-4B (collectively referred to as "FIG. 4") provide a flow diagram of an illustrative method for operating a security system.

DETAILED DESCRIPTION

Figure 1:
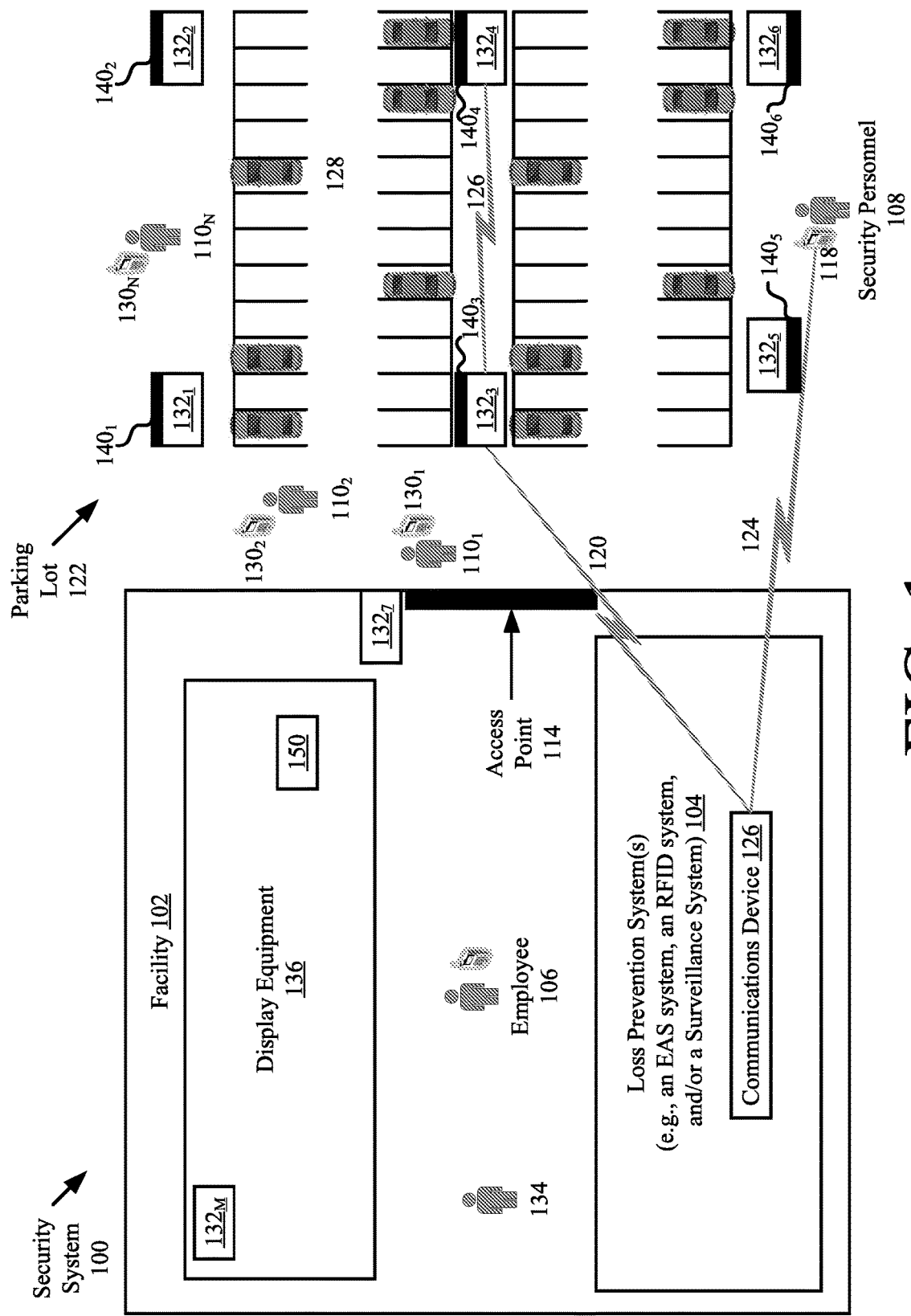
FIG. 1 provides an illustration of an illustrative security system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The terms "memory," "memory device," "data store," "data storage facility" and the like each refer to a non-transitory device on which computer-readable data, programming instructions (e.g., instructions 210 of FIGS. 2 and/or 320 of FIG. 3) or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The present document concerns implementing systems and methods for operating a security system. The methods comprise: monitoring an area for a presence of an individual or vehicle using wireless signals of a first type (e.g., LRR signals or SRR signals) that are received by a first radio of the security system; operating the first radio as a wireless sensor (e.g., a UWB sensor or an mmWave sensor) for generating sensor data; determining whether the individual or vehicle is exhibiting an unusual behavior using the sensor data and pre-programmed or machine learned patterns (e.g., of unusual behavior); changing an operating frequency of the first radio when a determination is made that the individual or vehicle is exhibiting unusual behavior; and/or communicating a wireless signal of a second type (e.g., an SRR signal, a sub-GHz signal or a cellular signal) from the first radio when the individual or vehicle is exhibiting unusual behavior. The wireless signal of the second type may be different than the wireless signal of the first type. The wireless signal of the second type may: disseminate information about the individual or vehicle to second radios of the security system; communicate information to law enforcement, security personnel, an employee, or a system of a neighboring venue; and/or cause a dynamic activation of a second radio of the security system which has a FOV into which the individual or vehicle is predicted to soon enter.

Referring now to FIG. 1, there is provided an illustration of an illustrative security system 100. System 100 is generally configured to mitigate unusual behavior (e.g., loitering, crimes or other unauthorized activities) using security devices $132_1, \ldots, 132_M$. Notably, the presence of such security devices $132_1, \ldots, 132_M$ provides a deterrent for unusual activity (e.g., criminal activity such as theft, collusion and/or physical attacks).

At least some of the security devices $132_1, \ldots, 132_6$ are placed in an outdoor area of a facility 102, such as a parking lot 122, court yard and/or pathway. These outdoor security devices $132_1, \ldots, 132_6$ may be mounted to light poles 1401, ..., 1406 or other structures (e.g., building walls, fences, trees, etc.). The outdoor security devices $132_1, \ldots, 132_6$ may be mounted a certain distance (e.g., 12 feet) from the ground so as to make it difficult for individuals to tamper with the security devices.

In some scenarios, one or more of the security devices $132_7$ are placed at the access point(s) 114 (e.g., doorways) of the facility 102. One or more of the security devices 132m may also be provided inside the facility 102. For example, a security device $132_M$ is coupled to display equipment 136. The display equipment 136 can include, but is not limited to, racks, shelves, cabinets, freezers, refrigerators, and/or other equipment for displaying articles (e.g., clothing).

The security devices $132_1, \ldots, 132_M$ facilitate predictive analytics with look-ahead sensing to enhance security of the facility 102. The business entity (e.g., a retailer) relies on data generated by the security devices $132_1, \ldots, 132_M$ to identify and quantify possible threats (e.g., stealing, collusion, armed attack, etc.) by individuals $110_1, \ldots, 110_N$, 134 well in advance of an incident so that the business entity may have sufficient time to react to the possible threats.

The predictive analytics are performed to: gain insight into the facility's in-coming individuals (e.g., retail store customers); and/or single out individuals or groups of individuals with an intent to steal or cause physical harm to others (e.g., employee 106) and/or personal property (e.g., merchandise 150). The results of the predictive analytics may be shared with law enforcement officials (not shown), security personnel 108, employees 106, a Loss Prevention System ("LPS") 104 of the facility 102, and/or systems of neighboring venue(s) (not shown). The law enforcement officials (not shown), security personnel 108 and/or employees 106 can then take one or more remedial measures to interrupt or otherwise prevent undesirable events or incidents within the facility 102 and/or surrounding areas.

The predictive analytics are performed by the security devices $132_1, \ldots, 132_M$, LPS 104 and/or a remote computing device (not shown) (e.g., a server). The LPS 104 includes, but is not limited to, an Electronic Article Surveillance ("EAS") system, a Radio Frequency Identification ("RFID") system, and/or surveillance system (e.g., a network of video cameras, audio sensors, and/or proximity sensors). EAS, RFID and surveillance systems are well known in the art, and therefore will not be described herein. Any known or to be known EAS, RFID and/or surveillance system can be used herein without limitation. In all cases, the LPS 104 includes a communication device 126 configured to communicate information to and from the security devices $132_1, \ldots, 132_M$ via wireless communications links 120 and/or mobile communication devices via wireless communications links 124. A more detailed block diagram of the communication device 126 is provided in FIG. 3.

The security devices $132_1, \ldots, 132_M$ and/or LPS 104 may also be configured to learn and detect patterns of unusual behavior via the use of a machine learning algorithm. Machine learning algorithms are well known in the art, and therefore will not be described herein. Any known or to be known machine learning algorithm can be used herein without limitation. For example, the security device(s) and/or LPS can learn over time that certain patterns of human behavior typically result in theft, collusion, loitering, kidnapping, and/or an attack. The present solution is not limited to the particulars of this example.

The unusual behavior can include, but is not limited to, a vehicle 128 entering the parking lot 122 erratically, a vehicle 128 traveling slowly into the parking lot 122 during off-business hours, a person paying a great amount of attention to the facility 102 or the facility's surroundings during off-business hours, an individual counting walking paces, individual(s) loitering in the parking lot 122, vehicles driving in different directions and/or in varying positions, individuals sharing information about the facility with each other (e.g., by using mobile communication devices), a gunshot being detected, and/or a recognition of a suspect license plate.

Figure 2:
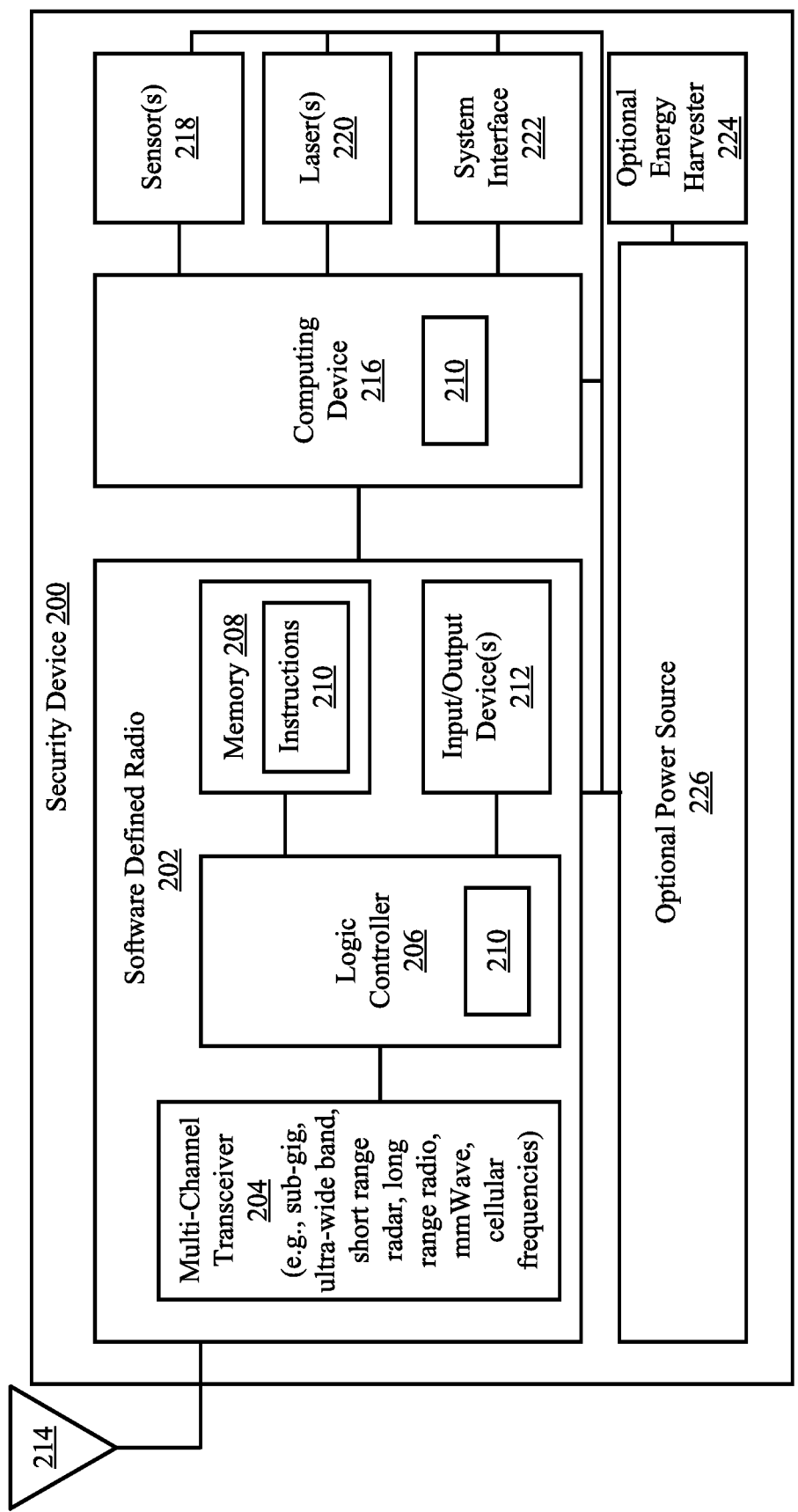
FIG. 2 provides an illustration of an illustrative architecture for the communications device shown in FIG. 1

An illustration of an illustrative architecture for a security device 200 is provided in FIG. 2. Each of the security devices $132_1, \ldots, 132_M$ of FIG. 1 is the same as or similar to security device 200. As such, the discussion of security device 200 is sufficient for understanding security devices $132_1, \ldots, 132_M$ of FIG. 1.

The security device 200 may include more or less components than that shown in FIG. 2. However, the components shown are sufficient to disclose an illustrative embodiment implementing the present solution. Some or all of the components of the security device 200 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an illustrative architecture of a representative security device 200 configured to facilitate improved unusual activity mitigation. In this regard, the security device 200 comprises a Software Defined Radio ("SDR") 202 for allowing data to be exchanged with an external device (e.g., LPS 104 of FIG. 1, other security devices $132_1\text{-}132_M$ of FIG. 1, mobile communication devices 118 of FIG. 1, and/or a remote server (not shown in FIG. 1)) via wireless communication technology. The communication technology can include, but is not limited to, cellular technology, Radio Frequency ("RF") technology, Bluetooth technology, and/or WiFi technology. The components 204-212 shown in FIG. 2 may be collectively referred to herein as the SDR 202. SDRs are well known in the art, and therefore will not be described in detail herein.

Still, it should be noted that the SDR 202 comprises an antenna 214 for allowing data to be exchanged with the external device via a wireless communication technology. The external device may comprise the LPS 104, security devices $132_1\text{-}132_M$, a mobile communication device 118 of FIG. 1, and/or a remote server. In this case, the antenna 214 is configured to transmit signals to and receive signals from the listed external devices. In this regard, the SDR 202 comprises a multi-channel transceiver 204. Multi-channel transceivers are well known in the art, and therefore will not be described herein. However, it should be understood that the multi-channel transceiver 204 supports operations within the following frequency ranges: a sub-GHz frequency range (e.g., 300 MHz-915 MHz), a UWB frequency range (e.g., 7 GHz-10 GHz), SRR frequency range (e.g., 24 GHz or WiFi), LRR frequency range (e.g., 24 GHz, 60 GHz, 76 GHz-81 GHz, and/or 94 GHz), and cellular radio frequency range (e.g., for Long Term Evolution ("LTE") and/or 5G).

The SDR 202 can simultaneously operate within two or more of the listed frequency ranges. Additionally or alternatively, the SDR 202 can switch operations between two or more of the listed frequency ranges. Such switching occurs in response to trigger events. The logic controller 206 (e.g., a processor) is configured to determine when a switch between frequency ranges is to occur, and cause the multi-channel transceiver to change the frequency range in which it operates when such a determination is made. In this regard, it should be noted that the logic controller 206 comprises a processor and a non-transitory computer-readable storage medium comprising programming instructions 210 that are configured to cause the processor to perform some or all of the methods discussed herein. The trigger events can include, but are not limited to, expiration of a pre-defined period of time, detection of an individual or vehicle in proximity to the SDR 202, detection of a given type of behavior by the individual or vehicle, detection of a particular type of object in the individual's possession, detection of a group of individual's associated with unusual behavior, movement of the individual or vehicle, and/or changes in events associated with the individual or vehicle.

The UWB frequency range is employed by the SDR 202 to detect human presence, human motion, vehicle presence, vehicle motion, and/or biometric characteristics of humans. Techniques for making such detections using UWB technology are well known in the art, and therefore will not be described herein. One such UWB based technique is disclosed in a document entitled "Sense through wall human detection using UWB radar" which was written by Singh et al. Such detections can be made even when the SDR's Line Of Sight ("LOS") is obscured by an object (e.g., a wall, opaque surfaces, glass, etc.) within relatively far distances (e.g., 20 m). The biometric characteristics can include, but are not limited to, respiration and/or heart rate. A rapid respiration pattern and/or heart rate may indicate nervousness or an impending health condition.

The SRR and/or LRR frequency range(s) is(are) employed by the SDR 202 to detect human presence, detect vehicle presence, and/or detect unusual behavior by individuals and/or vehicles. Techniques for detecting humans and vehicles using SRR and/or LRR signals are well known in the art, and therefore will not be described herein. Any known or to be known technique for detecting humans and vehicles using SRR and/or LRR signals can be used herein. One illustrative method for detecting human encounters from SRR (e.g., WiFi) signals is disclosed in an article entitled "Detecting Human Encounters from WiFi Radio Signals" which was written by Vanderhulst et al.

Notably, the SDR acts as an mmWave sensor when employing the LRR frequency range. mmWave sensors are well known in the art, and therefore will not be described herein in detail. Still, it should be understood that the mmWave sensor is sensitive to emissivity and reflectivity characteristics of various materials to the mmWave spectrum. Metallic objects exhibit lower emissivity and higher reflectivity to mmWave signals as compared to other materials. Thus, the mmWave sensor can aid in making accurate detections of the following items despite the surrounding environment's weather conditions: (1) certain objects that are covering a person's face (e.g., masks) or body (e.g., a bullet proof vest); and/or (2) certain objects that are concealed or otherwise obscured by clothing (e.g., concealed weapons and/or sharp objects). The mmWave sensor emits non-ionizing radiation, and therefore is considered safe for human exposure. Notably, the detection can also be performed using radiation in the atmosphere (passive detection).

The data collected by the SDR 202 (while operating in the UWB, SRR and/or LRR frequency bands) may be used to create patterns of machine learned unusual behavior, dynamically update a machine learning algorithm, and/or create Self-Organizing Cluster Maps ("SOCMs"). The SOCMs can include, but are not limited to, Kohonen cluster maps. The SOCMs are created to facilitate the identification of individuals exhibiting certain behaviors indicative of ulterior motives and/or the identification of groups of individuals collectively exhibiting certain behaviors indicative of ulterior motives. These behaviors can include, but are not limited to, walking nervously, tilting head downward, turning head or body away from a camera, covering a face, covering a head, and/or holding a suspicious object (e.g., a gun or knife).

The SRR, sub-GHz and/or cellular frequency range(s) is(are) employed by the SDR 202 to communicate the SOCMs and/or other information about the detected unusual behavior to other security devices in the network. These frequency ranges may also be employed by the SDR 202 to communicate information about the detected unusual behavior to security personal 108, employees 106 and/or law enforcement officials.

The security device 200 also comprises one or more lasers 220. The lasers 220 can include, but are not limited to, a visible laser, an Ultra-Violent ("UV") laser, and/or an Infrared ("IR") laser. The lasers 220 are used to capture vibration signals, convert the vibration signals into audible speech, and identify unusual conversations. Information about the information collected by the lasers 220 is communicated from the SDR 202 while operating in the sub-GHz frequency range and/or cellular frequency range.

As noted above, the SDR 202, sensors 218, and/or laser(s) 220 are configured to obtain information about individuals, vehicles, objects, and/or personal devices (e.g., smart phones, cellular phone, personal digital assistants, etc.). This information is logged in memory 208, and/or communicated to an external datastore (e.g., a remote database). The sensors 218 may include, but are not limited to, microphone(s). The microphone(s) allow(s) the detection and location of, for example, gun shots and/or noises indicating a fight or other altercations (e.g., fights or calls for help).

Memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 210 are stored in memory 208 for execution by the security device 200 and that cause the communication device 200 to perform any one or more of the methodologies of the present disclosure. The instructions 210 are generally operative to facilitate the mitigation of unusual activity. Other functions of the security device 200 will become apparent as the discussion progresses.

As shown in FIG. 2, the security device 200 also includes a computing device 216. The computing device 216 is generally configured to control operations of the security device 200. These operations include, but are not limited to, operations to (a) learn patterns of unusual or suspicious behaviors, (b) identify the presence of individuals and/or vehicles based on collected information by the SDR 202, (c) collect information about the behaviors of the individuals, (d) collect information about movement of the vehicles, (e) classify the behaviors of the individuals using machine learned patterns of unusual or suspicious behaviors of individual and/or vehicles, (f) organize the individuals into groups based on the classified behaviors, (g) track movements of the individuals and/or vehicles, and/or (h) cause information about detected individuals and/or vehicles to be communicated to external device(s). Other operations of the computing device 216 will become evident as the discussion progresses.

The computing device 216 can include any device capable of processing and storing data. Computing device 216 may be the same as or substantially similar to the communications device 126 shown in FIGS. 1 and 3. As such, the discussion provided herein in relation to communications device 126 is sufficient for understanding the computing device 216 of the security device 200.

In some scenarios, the security device 200 includes a power source 226 and/or an energy harvester 224. In those or other scenarios, the security device 200 is connected to an external power source. The power source 226 includes, but is not limited to, a battery. The battery may be rechargeable. The battery may be recharged by the energy harvester 224. Energy harvesters are well known in the art, and therefore will not be described herein. Any known or to be known energy harvester can be used herein without limitation. In some scenarios, the energy harvester 224 harvests energy from light, solar energy, heat, RF fields, and/or magnetic fields.

Figure 3:
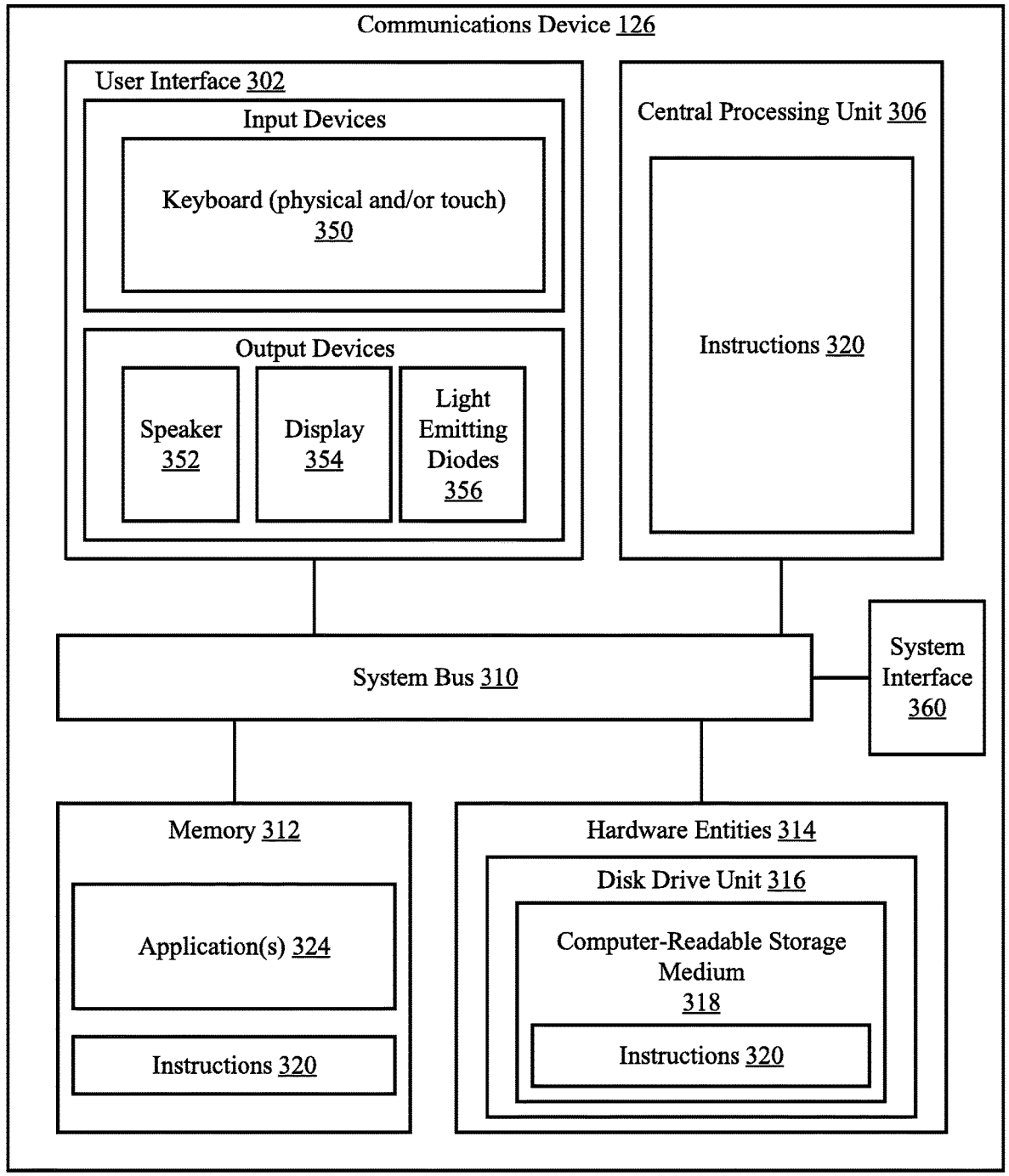
FIG. 3 provides an illustration of an illustrative architecture a security device.

Referring now to FIG. 3, there is provided a detailed block diagram of an illustrative architecture for the communication device 126. Communication device 126 may include more or less components than those shown in FIG. 3. However, the components shown are sufficient to disclose an illustrative embodiment implementing the present solution. The hardware architecture of FIG. 3 represents one embodiment of a representative communication device configured to facilitate the mitigation of criminal activities. As such, the communication device 126 of FIG. 3 implements at least a portion of a method for deterring, preventing or proving criminal activities. This method involves communicating information between the LPS 104 and security devices $132_1, \ldots, 132_M$, the LPS 104 and mobile communication devices 118, and/or the LPS 104 and a remote computing device (e.g., a server).

Some or all components of the communication device 126 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the communication device 126 comprises a user interface 302, a Central Processing Unit ("CPU") 306, a system bus 310, a memory 312 connected to and accessible by other portions of communication device 126 through system bus 310, and hardware entities 314 connected to system bus 310. The user interface can include input devices (e.g., a keyboard 350) and output devices (e.g., speaker 352, a display 354, and/or light emitting diodes 356), which facilitate user-software interactions for controlling operations of the communication device 126.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the communication device 126. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the communication device 126 and that cause the communication device 126 to perform any one or more of the methodologies of the present disclosure.

In some scenarios, the hardware entities 314 include an electronic circuit (e.g., a processor) programmed for facilitating the mitigation of unusual activity. The unusual activity includes, but is not limited to, criminal activity and/or unauthorized activity. In this regard, it should be understood that the electronic circuit can access and run application(s) 324 installed on the communication device 126. The software application 324 is generally operative to facilitate: the detection of unusual activity in facility 102; the communication of information to and from the LPS 104 that is useful in identifying individual(s) and/or groups of individuals that is(are) associated with the detected unusual activity; the dynamic activation of security devices $132_1, \ldots, 132_M$ as unusual activity based events develop; and the provision of notifications relating to the unusual activity to law enforcement, security personnel, employees, or system(s) of neighboring venue(s). Other functions of the software application 324 will become apparent as the discussion progresses.

Figure 4B:
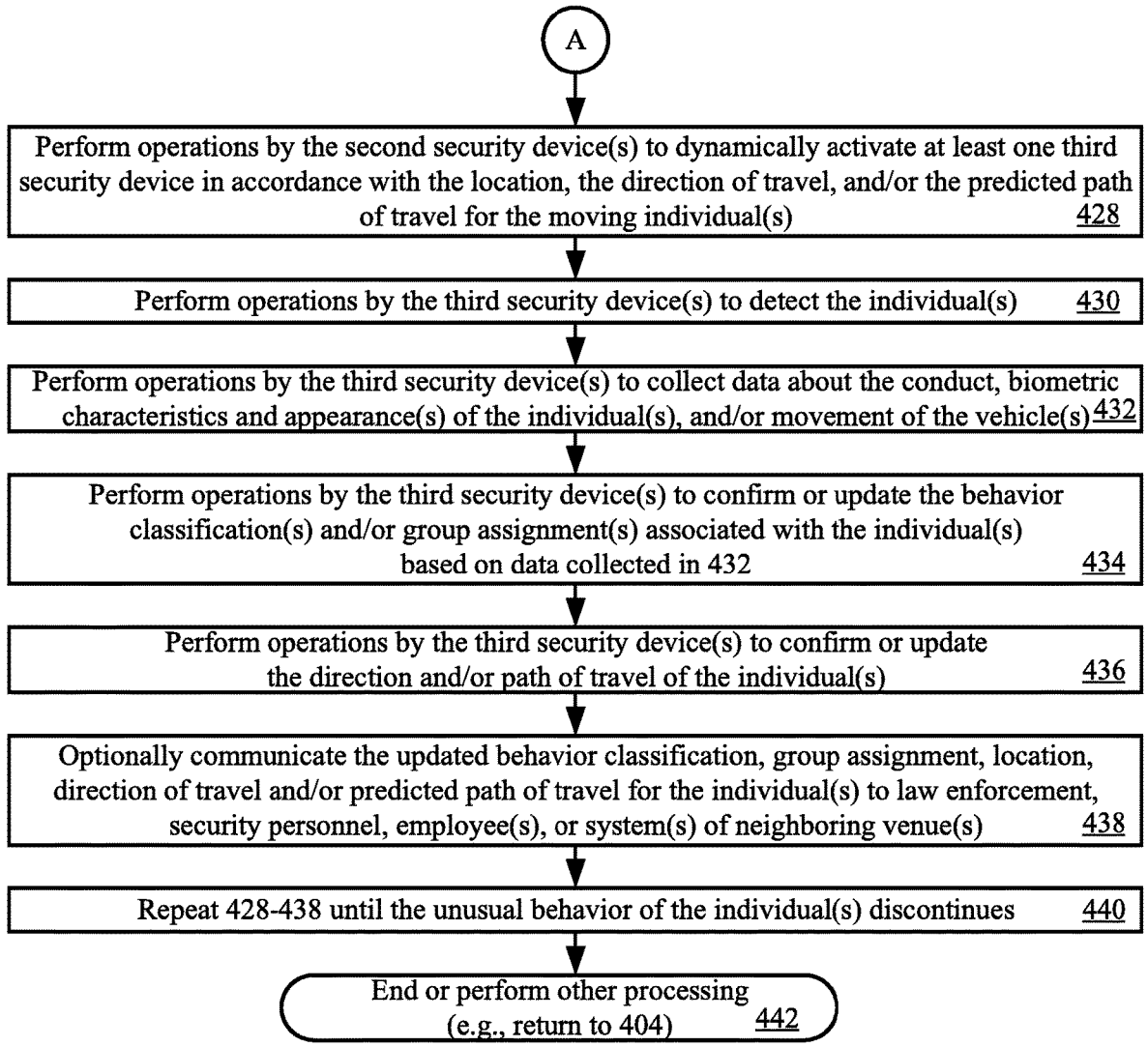

Referring now to FIGS. 4A-4B, there is provided a flow diagram of an illustrative method 400 for operating a security system (e.g., security system 100 of FIG. 1). Method 400 begins with 402 and continues with 404 where one or more individuals and/or vehicles are detected by one or more first security devices (e.g., security device $132_1, \ldots, 132_M$ of FIG. 1) of the security system. This detection can be made by: causing an SDR (e.g., SDR 202 of FIG. 2) to switch communication operations from a first frequency range (e.g., a sub-GHz or cellular radio frequency range) to a second different frequency range (e.g., UWB communication operations, SRR communication operations or LRR communication operations); and/or detecting human presence and/or vehicle presence from UWB, SRR or LRR signals. In some scenarios, the SDR may concurrently and/or sequentially operate in two or more different frequency bands (e.g., UWB followed by LRR, or SRR followed by LRR, etc.) so as to increase the accuracy of such detection(s).

Alternatively or additionally, the detection(s) is(are) made in 404 using one or more lasers (e.g., laser(s) 220 of FIG. 2) of the first security device(s). The lasers can include, but are not limited to, a visible laser, a UV laser, and/or an IR laser. The laser(s) capture(s) vibration signals and convert(s) the same into audible sounds. When audible speech is captured, then a detection is made that an individual is in proximity to the first security device(s). When a vehicle sound is captured, then a detection is made that a vehicle is in proximity to the first security device(s).

In 406, the first security device(s) collect(s) data about (1) the conduct, biometric characteristics, appearance(s) and/or object(s) of the individual(s) and (2) movement of the vehicle(s). Data for human motion, vehicle motion and/or biometric characteristics is collected by the first security device(s) using laser(s) and/or the SDR(s) operating in the UWB, SRR and/or LRR frequency range(s). Accordingly, the first security device(s) may dynamically switch the operating frequency of the SDR(s) during 406 between an UWB operating frequency, an SRR operating frequency and/or an LRR operating frequency. The dynamic switching of the SDR operating frequency may be made in accordance with a pre-defined timing and/or sequence, in response to a detection of an individual or vehicle while operating at a default or starting operating frequency (e.g., SRR operating frequency or LRR operating frequency), in response to command signals from an adjacent security device and/or other remote device (e.g., a remote server), and/or in response to a determination that data collected using one operating frequency is sufficient for learning patterns of unusual behavior based on the given type of collected data.

In 408, the collected data is used by the first security device(s) and/or a remote computing device (e.g., communication device 126 of FIG. 1 or a remote server) to machine learn patterns of unusual behavior. Machine learning algorithms are well known in the art, and therefore will not be described herein. Any known or to be known machine learning algorithm can be used herein. The machine learned patterns of unusual behavior can be at least partially defined by: a person's conduct to hide, cover or otherwise obscure one's facial identity; a person's nervous movements; a person's possession of certain types of objects (e.g., sharp objects and/or fire arms); a person's use of a vehicle with tinted windows or other disguising features; person's lingering or loitering in a given area for a certain amount of time; and/or a person's erratic or slow driving. The machine learned patterns of unusual behavior may be stored locally at the first security device(s), in a remote datastore accessible to the first security device(s), and/or disseminated to other security device(s) and/or security systems. The machine learned patterns of unusual behavior can be stored in association with behavior type identifiers (e.g., theft, collusion, attack, reconnaissance, surveying, break-in, arson, loitering, etc.).

Notably, method 400 may be absent of operations 404-408 in some scenarios. In this case, the security system is simply programmed with patterns of unusual behavior which were learned by another security system owned by the same business entity or a different business entity. In other scenarios, the security system performs operations 404-408 to create new patterns of unusual behavior and/or to optimize or otherwise modify pre-programmed patterns of unusual behavior.

After completing 408, method 400 continues with 410 where second security device(s) (e.g., security device 132₁ of FIG. 1) perform(s) operations to monitor an area (e.g., a parking lot 122 of FIG. 1). The second security device(s) include(s) the first security device(s) and/or other security device(s). This monitoring is achieved using lasers and/or by operating SDR(s) of the second security device(s) in the UWB, SRR, LRR and/or cellular frequency range(s) to collect data useful for detecting the presence of individual(s) and/or vehicle(s) in the monitored area, identifying the individual(s) (e.g., the individual's mobile phone identifier), determining the conduct of the individual(s), determining biometric characteristics of the individual(s), determining appearance(s) of the individual(s), identifying types of objects in the individual(s) possession, and/or detecting movements of the vehicle(s) within the monitored area.

In 411, the data collected in 410 is analyzed by the second security device(s) and/or a remote device (e.g., communications device 126 of FIG. 1) to (1) detect individual(s) present within the monitored area, (2) detect any associations between the individuals (e.g., friend or family because all traveled to the monitored area together and/or in the same vehicle), and/or (3) organize the detected individuals into groups or clusters of people based on the results of the detection operations of (2). In some scenarios, the grouping or clustering of people is achieved using an SOCM algorithm. SOCM algorithms are well known in the art, and therefore will not be described herein. Any known or to be known SOCM algorithm can be used herein without limitation.

In 412, the data collected in 410 is also used to identify one or more individuals in the monitored area that are exhibiting certain behaviors based on the machined learned patterns of unusual behavior. This identification can be made by: comparing data collected in 410 to the data defining the machine learned patterns of unusual behavior to determine if a match exists therebetween; and concluding that the individual(s) is(are) exhibiting certain behaviors when a match (e.g., by a certain amount such as >75%) exists between the data collected in 410 and the data defining of at least one of the machine learned patterns of unusual behavior. When such a conclusion is made, the behavior of each identified individual is then classified in 414. This classification can be made based on the behavior type identifiers associated with the matching machine learned pattern(s) of unusual behavior. The behavior classification can include, but is not limited to, a theft classification, a collusion classification, an attack classification, a reconnaissance classification, a surveying classification, a break-in classification, an arson classification, and/or a loitering classification.

In 414, the behavior being performed by each individual is classified. This classification can be made by retrieving the behavior type identifier associated with the matching machine learned pattern of unusual behavior. The behavior type identifier can include, but is not limited to, an identifier for theft, an identifier for collusion, an identifier for attack, an identifier for reconnaissance, an identifier for surveying, an identifier for a break-in, an identifier for arson, or an identifier for loitering.

In 416, the identified individual(s) are optionally re-organized based on the respective behavior classifications. For example, in 411, a first individual and a second individual were assigned to a first group since they came from the same vehicle, while a third individual and a fourth individual were assigned to a second group since they walked to the monitored area together. In 414, the first individual's behavior and the third individual's behavior was classified as surveying. Accordingly, the following operations are performed: a re-assignment or additional assignment of the first and second individuals to the second group; a re-assignment or additional assignment of the third and fourth individuals to the first group or the third group; or a re-assignment of the first, second, third and fourth individuals to the fourth group. The present solution is not limited to the particulars of this example.

In 418, operations are performed by the second security device(s) to disseminate information about the identified individual(s) and associated behavior to other third security device(s) (e.g., security device 132₂, 132₃ and/or 132₄ of FIG. 1). The information is disseminated using the SDR(s) of the second security device(s) operating in the sub-GHz, SRR (e.g., WiFi) and/or cellular frequencies. Accordingly, the operating frequency of the SDR(s) may be dynamically switched in 418 from: the UWB operating frequency to the SRR, sub-GHz or cellular frequency; the LRR operating frequency to the SRR, sub-GHz or cellular frequency; or the SRR operating frequency to the sub-GHz or cellular operating frequency.

The third security device(s) can include, but are not limited to, security devices which are monitoring areas adjacent to the area being monitored by the second security device(s), security devices which are part of the same security system as the second security device(s), and/or security devices which are part of a different security system of neighboring venue. The disseminated information can include, but is not limited to, image(s) of the individual(s), identifying information for the individual(s) (e.g., an individual's mobile phone identifier and/or biometric characteristic(s)), behavior classification(s) associated with the individual(s), group assignment(s) for the individual(s), and/or last detected location(s) of the individual(s).

In 420, the second and/or third security device(s) perform operations to communicate information about the individual(s) and/or groups of individuals to law enforcement, security personnel (e.g., security personnel 108 of FIG. 1), employees (e.g., employee 106 of FIG. 1), and/or security system(s) of neighboring venue(s). This communication is achieved using the SDR(s) of the second and/or third security device(s) operating in the sub-GHz, SRR (e.g., WiFi) and/or cellular frequencies. Accordingly, the operating frequency of the SDR(s) may be dynamically switched in 420, for example, from the SRR operating frequency to the cellular operating frequency. The information communicated in 420 can include, but is not limited to, image(s) of the individual(s), identifying information for the individual(s) (e.g., an individual's mobile phone identifier and/or biometric characteristic(s)), behavior classification(s) associated with the individual(s), group assignment(s) for the individual(s), and/or last detected location(s) of the individual(s).

In 422, the second security device(s) perform(s) operations to detect movement of at least one of the previously identified individuals performing unusual behavior. This detection is made by the second security device(s) using the lasers and/or SDR operating in the UWB frequency range, the SRR frequency range, and/or the LRR frequency range. For example, a change in the volume of captured speech indicates that an individual is walking or otherwise moving locations. Similarly, changes in the UWB, SRR and/or LRR sensor data collected by the SDR may indicate that an individual is walking or otherwise moving locations. The present solution is not limited to the particulars of this example.

In 424, the second security device(s) and/or a remote computing device (e.g., computing device 126 of FIG. 1) analyze the laser data and/or SDR sensor data to determine a direction and/or predicted path of travel for the moving individual(s). Techniques for determining directions and/or paths of travels of individuals are well known in the art, and therefore will not be described herein. Any known or to be known technique for determining directions and/or paths of travels of individuals can be used here. For example, in some scenarios, an individual's direction of travel is determined based on changes in captured speech and/or changes in coordinates of an individual's location within a multi-dimensional sensor's FOV. The present solution is not limited to the particulars of this example.

The location(s), direction(s) of travel and/or predicted path(s) of travel for the moving individual(s) is optionally communicated in 426 from the second security device(s) and/or remote computing device to law enforcement, security personnel, employee(s) and/or systems of neighboring venue(s).

Upon completing 424 or 426, method 400 continues with 428 of FIG. 4B. As shown in FIG. 4B, 428 involves performing operations by the second security device(s) to dynamically activate at least one third security device in accordance with the location, the direction of travel, and/or predicted path of travel for the moving individual(s). The operations can involve communicating an SRR or LRR signal from the second security device(s) to the third security device(s). In some scenarios, 428 is optional since the third security device(s) is(are) always activated or is activated when its internal proximity sensor detects proximity of an individual or vehicle.

In 430, the third security device(s) perform(s) operations to detect the presence of the individual(s) within its FOV or LOS. This detection can be made by: causing an SDR (e.g., SDR 202 of FIG. 2) to switch communication operations from a first frequency range (e.g., a sub-GHz or cellular radio frequency range) to a second different frequency range (e.g., UWB frequency range, SRR frequency range, LRR frequency range, or cellular frequency range); and/or detecting human presence and/or vehicle presence from UWB, SRR, LRR or cellular signals. Alternatively or additionally, the detection(s) is(are) made in 430 using one or more lasers (e.g., laser(s) 220 of FIG. 2) of the third security device(s). The lasers can include, but are not limited to, a visible laser, a UV laser, and/or an IR laser. The laser(s) capture(s) vibration signals and convert(s) the same into audible sounds. When audible speech or a vehicle sound is captured, then a detection is made that an individual is in proximity to the third security device(s).

In 432, the third security device(s) perform operations to collect data about the (1) the conduct, biometric characteristics, appearance(s) and/or object(s) of the individual(s) and (2) movement of the vehicle(s). Data for human motion, vehicle motion and/or biometric characteristics is collected by the third security device(s) using laser(s) and/or the SDR(s) operating in the UWB, SRR and/or LRR frequency range(s). Accordingly, the third security device(s) may switch the operating frequency of the SDR(s) during 432 between an UWB operating frequency, an SRR operating frequency and/or an LRR operating frequency. The switching of the SDR operating frequency may be made in accordance with a pre-defined timing and/or sequence, in response to a detection of an individual or vehicle while operating at a default or starting operating frequency (e.g., SRR operating frequency or LRR operating frequency), in response to command signals from an adjacent security device and/or other remote device (e.g., a remote server), and/or in response to a determination that data collected using one operating frequency is sufficient for detecting patterns of unusual behavior based on the given type of collected data. 432 may also involve using one or more microphones to facilitate a detection and location of a gunshot or noises indicating an altercation.

In 434, the third security device(s) and/or a remote computing device (e.g., computing device 126 of FIG. 1) perform(s) operations to confirm or update the behavior classification(s) and/or group assignment(s) associated with the individual(s) based on the data collected in 432. This confirmation or updating is achieved by using the data collected in 432 to determine if one or more of the detected individuals are exhibiting certain behaviors based on the machined learned patterns of unusual behavior. This determination can be made by: comparing data collected in 432 to the data defining the machine learned patterns of unusual behavior to determine if a match exists therebetween; and concluding that the individual(s) is(are) exhibiting certain behaviors when a match (e.g., by a certain amount such as >75%) exists between the data collected in 432 and the data defining at least one of the machine learned patterns of unusual behavior. When such a conclusion is made, the behavior of each identified individual is then classified. This classification can be made based on the behavior type identifiers associated with the matching machine learned pattern(s) of unusual behavior. The behavior classification can include, but is not limited to, a theft classification, a collusion classification, an attack classification, a reconnaissance classification, a surveying classification, a break-in classification, an arson classification, and/or a loitering classification. If the behavior classification made in 434 is the same as the behavior classification made in 414, then a confirmation is made that the behavior classification for the respective individual is still valid or accurate. In contrast, if the classification made in 434 is different than the behavior classification made in 414, then the behavior classification for the respective individual is updated to reflect the type of behavior determined in 434. The identified individual(s) is(are) optionally re-grouped based on any updated behavior classifications.

In 436, the third security device(s) and/or a remote computing device (e.g., computing device 126 of FIG. 1) perform operations to confirm or update the direction and/or path of travel of the individual. An update can be made when (1) there is a difference between the direction determined in 436 and the direction determined in 424 and/or (2) there is a difference between the path of travel determined in 436 and the path of travel determined in 424. Techniques for determining directions and paths of travel for individuals are well known in the art, and therefore will not be described here. Any known or to be known technique for determining directions and paths of travel for individuals can be used here.

Upon completing 436, method 400 continues with optional 438 where update information is communicated from the third security device(s) and/or remote computing device to law enforcement, security personnel, employee(s), and/or system(s) of neighboring venue(s). The information can include, but is not limited to, an updated behavior classification, an updated group assignment, an updated geographical location, an updated direction of travel, and/or an updated predicted path of travel for the individual(s).

The operations of 428-438 are repeated until the unusual behavior of the individual(s) discontinue(s), as shown by 440. Subsequently, 442 is performed where method 400 ends or other processing is performed.

Figure 5:
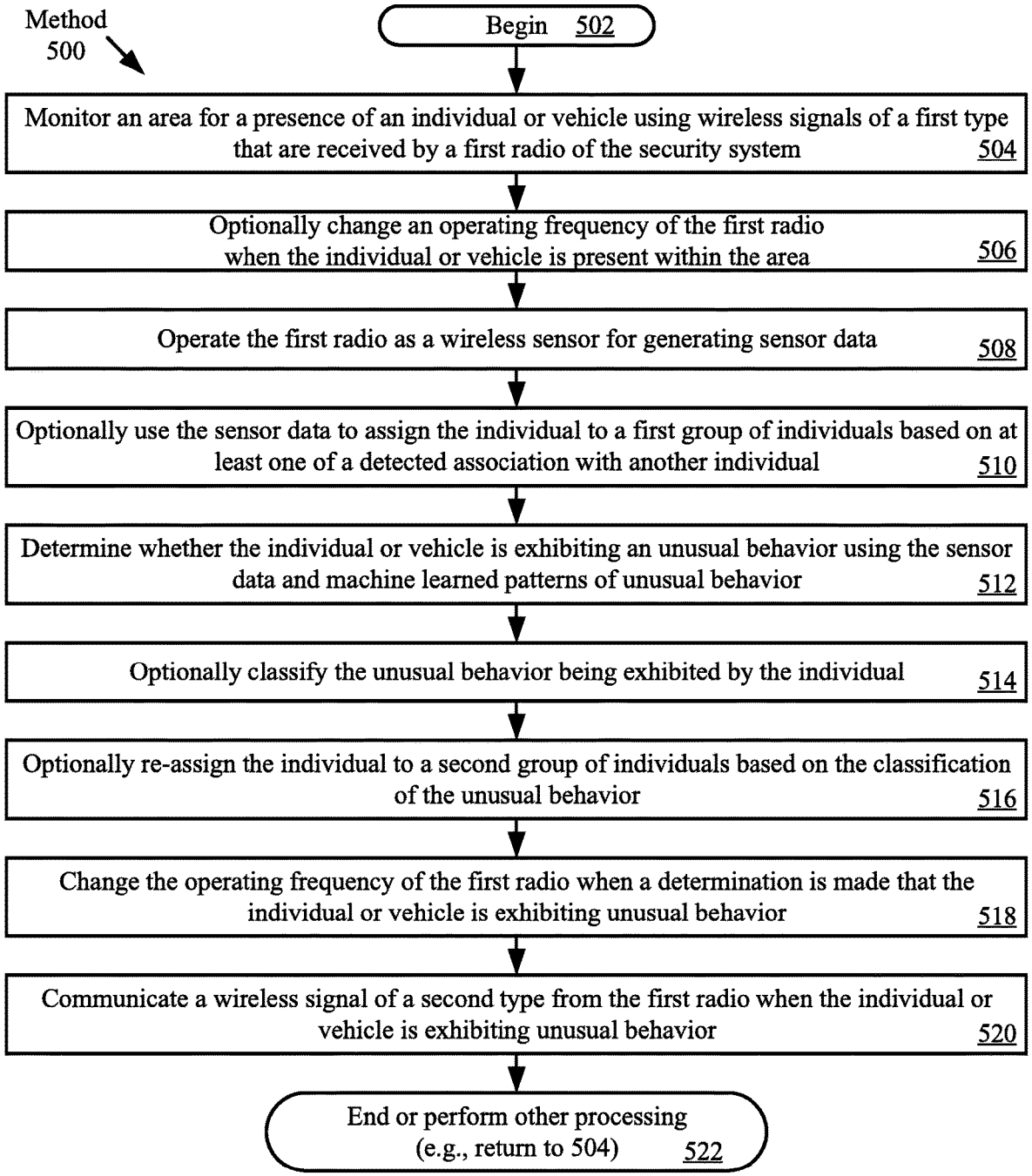
FIG. 5 provides a flow diagram of an illustrative method for operating a security system.

Referring now to FIG. 5, there is provided a flow diagram of an illustrative method 500 for operating a security system (e.g. security system 100 of FIG. 1). Method 500 begins with 502 and continues with 504 where an area (e.g., a parking lot 122 or facility 102 of FIG. 1) is monitored for a presence of an individual (e.g., individual $110_1, \ldots,$ or $110_N$, 134 of FIG. 1) or vehicle (e.g., vehicle 128 of FIG. 1) using wireless signals of a first type that are received by a first radio (e.g., security device $132_1, \ldots,$ or $132_M$ of FIG. 1, security device 200 of FIG. 2, and/or radio 202 of FIG. 2) of the security system. The wireless signals of the first type include, but are not limited to, SRR signals or LRR signals.

Next in optional 506, an operating frequency of the first radio is changed when the individual or vehicle is present in the area. For example, the operating frequency is changed to an SRR operating frequency, an LRR operating frequency or an UWB operating frequency. The present solution is not limited to the particulars of this example.

In 508, the first radio is operated as a wireless sensor for generating sensor data. The sensor data may optionally be used in 510 to assign the individual to a first group of individuals based on at least one of a detected association with another individual. The sensor data is used along with machine learned patterns of unusual behavior in 512 to determine whether the individual or vehicle is exhibiting an unusual behavior. The unusual behavior being exhibited by the individual is optionally classified in 514. In optional 516, the individual is re-assigned to a second group of individuals based on the classification of the unusual behavior.

In 518, the operating frequency of the first radio is changed when a determination is made that the individual or vehicle is exhibiting unusual behavior. A wireless signal of a second type is communicated from the first radio in 520 when the individual or vehicle is exhibiting unusual behavior. The wireless signal of the second type is different than the wireless signal of the first type. The wireless signal of the second type includes, but is not limited to, an SRR signal, a sub-GHz signal or a cellular signal.

The wireless signal of the second type may: disseminate information about the individual or vehicle to second radios of the security system; communicate information to law enforcement, security personnel, an employee, or a system of a neighboring venue; and/or causes a dynamic activation of a second radio (e.g., security device $132_1, \ldots,$ or $132_M$ of FIG. 1, security device 200 of FIG. 2, and/or radio 202 of FIG. 2) of the security system which has an FOV into which the individual or vehicle is predicted to soon enter.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a security device, comprising:
    collecting, by one or more lasers of the security device, vibration signals of an individual in a monitored area;
    converting the collected vibration signals into audible speech;
    identifying the audible speech as unusual conversation based on pre-programmed or machine learned patterns of unusual behavior, wherein identifying the audible speech as unusual conversation further comprises:
        creating one or more self-organizing cluster maps (SOCMs) to facilitate identification of one or more individuals exhibiting certain behaviors indicative of ulterior motives, the one or more individuals including the individual in the monitored area; and
        classifying the individual based on the SOCMs in accordance with at least one behavior type identifier comprising at least one or more of theft, reconnaissance, loitering, and collusion;
    detecting movement of the individual based on the collection of vibration signals of the individual; and
    communicating, by the security device, a wireless signal to a communication device associated with a venue.

2. The method according to claim 1, wherein the monitored area is a parking lot adjacent to the venue.

3. The method according to claim 1, wherein the communicating the wireless signal further comprises:
    communicating, by the security device, the wireless signal to a communications device of a security system; and
    communicating, by the communications device of the security system, a subsequent wireless signal to the communication device associated with the venue.

4. The method according to claim 1, wherein the wireless signal includes the audible speech.

5. The method according to claim 1, wherein the communication device associated with the venue is further associated with one of law enforcement, security personnel, an employee, or a system of a neighboring venue.

6. The method according to claim 1, further comprising detecting movement of the individual based on a change in volume of the vibration signals of the individual.

7. The method according to claim 1, further comprising determining direction and/or path of travel of the individual based on the collection of vibration signals of the individual.

8. The method according to claim 7, wherein the wireless signal includes the determined direction and/or path of travel of the individual.

9. The method according to claim 1, wherein the unusual behavior is classified as walking nervously, tilting head downward, turning head or body away from a camera, covering a face, covering a head, holding a suspicious object, theft, collusion, attack, reconnaissance, surveying, break in, arson or loitering.

10. The method according to claim 1, wherein creating the one or more SOCMs further comprises creating the one or more SOCMs to facilitate identification of groups of individuals collectively exhibiting the certain behaviors indicative of the ulterior motives.

11. A security device, comprising:
one or more lasers configured to:
collect vibration signals of an individual in a monitored area; and
convert the collected vibration signals into audible speech;
a processor configured to:
identify the audible speech as unusual conversation based on pre-programmed or machine learned patterns of unusual behavior, wherein the processor configured to identify the audible speech as unusual conversation is further configured to:
create one or more self-organizing cluster maps (SOCMs) to facilitate identification of one or more individuals exhibiting certain behaviors indicative of ulterior motives, the one or more individuals including the individual in the monitored area; and
classifying the individual based on the SOCMs in accordance with at least one behavior type identifier comprising at least one or more of theft, reconnaissance, loitering, and collusion;
detect movement of the individual based on the collection of vibration signals of the individual; and
a transceiver configured to communicate a wireless signal to a communication device associated with a venue.

12. The security device according to claim 11, wherein the monitored area is a parking lot adjacent to the venue.

13. The security device according to claim 11, wherein the transceiver is configured to communicate the wireless signal to a communications device of a security system and the communications device of the security system is configured to communicate a subsequent wireless signal to the communication device associated with the venue.

14. The security device according to claim 11, wherein the wireless signal includes the audible speech.

15. The security device according to claim 11, wherein the communication device associated with the venue is further associated with one of law enforcement, security personnel, an employee, or a system of a neighboring venue.

16. The security device according to claim 11, wherein the processor is further configured to detect movement of the individual based on a change in volume of the vibration signals of the individual.

17. The security device according to claim 11, wherein the processor is further configured to determine a direction and/or path of travel of the individual based on the collection of vibration signals of the individual.

18. The security device according to claim 17, wherein the wireless signal includes the determined direction and/or path of travel of the individual.

19. The security device according to claim 11, wherein the unusual behavior is classified as walking nervously, tilting head downward, turning head or body away from a camera, covering a face, covering a head, holding a suspicious object, theft, collusion, attack, reconnaissance, surveying, break in, arson or loitering.

20. The security device according to claim 11, wherein the processor configured to create the one or more SOCMs is further configured to create the one or more SOCMs to facilitate identification of groups of individuals collectively exhibiting the certain behaviors indicative of the ulterior motives.

* * * * *